United States Patent
Wu et al.

(10) Patent No.: US 6,884,450 B2
(45) Date of Patent: Apr. 26, 2005

(54) POLYPROPYLENE CONTAINERS

(75) Inventors: Wen P. Wu, Pittsford, NY (US); Tapan Banerjee, Canandaigua, NY (US); Ute Honert, Warburg/Westfalen (DE); Gary D. Ennis, Canandaigua, NY (US); Mark A. Erickson, Fairport, NY (US)

(73) Assignee: Pactiv Corporation, Lake Forest, IL (US)

( * ) Notice: Subject to any disclaimer, the term of this patent is extended or adjusted under 35 U.S.C. 154(b) by 225 days.

(21) Appl. No.: 10/263,528

(22) Filed: Oct. 3, 2002

(65) Prior Publication Data

US 2004/0067288 A1 Apr. 8, 2004

(51) Int. Cl.⁷ .............................................. B32B 27/32
(52) U.S. Cl. ...................... 426/398; 428/34.7; 428/516; 156/198; 53/485
(58) Field of Search ................ 428/34.7, 516; 426/398; 156/198; 53/485

(56) References Cited

U.S. PATENT DOCUMENTS

| | | | |
|---|---|---|---|
| 4,668,575 A | | 5/1987 | Schinkel et al. |
| 5,001,016 A | | 3/1991 | Kondo et al. |
| 5,204,179 A | * | 4/1993 | Baker et al. ................ 428/336 |
| 5,326,625 A | | 7/1994 | Schuhmann et al. |
| 5,460,878 A | | 10/1995 | Hostetter |
| 5,508,090 A | | 4/1996 | Peiffer et al. |
| 5,614,315 A | | 3/1997 | Kondo et al. |
| 5,681,650 A | | 10/1997 | Peiffer et al. |
| 5,851,640 A | | 12/1998 | Schuhmann et al. |
| 5,962,092 A | | 10/1999 | Kuo et al. |
| 6,033,514 A | | 3/2000 | Davis et al. |
| 6,113,996 A | | 9/2000 | Amon et al. |
| 6,127,043 A | | 10/2000 | Lange |
| 6,159,612 A | | 12/2000 | Chu et al. |
| 6,242,084 B1 | | 6/2001 | Peet ........................ 428/318.6 |
| 6,303,233 B1 | | 10/2001 | Amon et al. |
| 6,322,883 B1 | | 11/2001 | Williams |
| 6,326,068 B1 | | 12/2001 | Kong et al. |
| 6,511,568 B1 | * | 1/2003 | Eckstein et al. ............ 156/216 |
| 6,596,385 B1 | * | 7/2003 | Perez ........................ 428/213 |
| D485,755 S | * | 1/2004 | Isler et al. .................... D9/425 |
| D487,210 S | * | 3/2004 | Isler et al. .................... D7/354 |
| 6,773,775 B1 | * | 8/2004 | Inoue et al. ............... 428/35.4 |
| 6,773,818 B1 | * | 8/2004 | Cretekos et al. ............ 428/461 |
| D495,920 S | * | 9/2004 | Isler et al. .................... D7/354 |
| 2001/0031371 A1 | * | 10/2001 | Kong et al. ................ 428/516 |
| 2002/0039630 A1 | | 4/2002 | Rousselet et al. .......... 428/36.7 |
| 2004/0067288 A1 | * | 4/2004 | Wu et al. .................... 426/316 |

FOREIGN PATENT DOCUMENTS

| | | | |
|---|---|---|---|
| DE | 100 54 672 A | 5/2002 | .......... B32B/27/30 |
| EP | 0 850 756 A3 | 2/1999 | .......... B32B/27/32 |
| WO | WO 01/25005 | * 4/2001 | |
| WO | WO 2004/033323 | * 4/2004 | |

OTHER PUBLICATIONS

Derwent Abstract (JP–2004122506), Apr. 2004.*
PCT International Search Report dated Jul. 1, 2004, from International Application No. PCT/US2003/29027, filed Sep. 19, 2003 (3 pages).

* cited by examiner

Primary Examiner—D. Lawrence Tarazano
(74) Attorney, Agent, or Firm—Winston & Strawn LLP

(57) ABSTRACT

A container comprises a substrate and a multi-layer film The substrate has a bottom wall and a continuous base wall in which the continuous base wall encompasses the bottom wall and extends upwardly therefrom. The substrate comprises at least one particulate mineral filler and polypropylene. The multi-layer film is attached to the substrate. The multi-layer film comprises at least a first layer and a second layer The first layer comprises a metallocene-catalyzed polyolefin The second layer comprises polypropylene. The substrate and the multi-layer film are made in the absence of ethylene vinyl alcohol copolymer (EVOH), ethylene vinyl acetate copolymer (EVA), and ethylene methyl acrylate copolymer (EMA).

38 Claims, 2 Drawing Sheets

POLYPROPYLENE CONTAINERS

FIELD OF INVENTION

The present invention relates generally to polypropylene containers. More particularly, the present invention relates to a mineral-filled polypropylene container with a multi-layer sealable film.

BACKGROUND OF THE INVENTION

The use of inexpensive polymeric packaging containers has become popular, especially with various food products. One example where these containers have been used is in modified atmosphere packaging. One example of a modified atmosphere packaging is case-ready processing which generally refers to a type of packaging that occurs regionally into point of sale units (e.g., a pound of ground beef or other products) These point of sale units are packaged and ready for display to the customer. This is in contrast to conventional supply chains for meat products that typically involve shipment of large cuts of meat (e.g., a side of beef) to the retail grocer who will divide the meat into the point of sale units.

Containers used with case-ready packaging often are sealed by a lidding film and, thus, require the container surface to be sealable with the lidding film. These containers may include a substrate and a film layer(s) attached to the substrate. To improve the gas barrier property of the container, the film layer(s) of these containers often have barrier resin such as ethylene vinyl alcohol copolymer (EVOH), and the associated tie layer resin such as ethylene methyl acrylate copolymer (EMA) and/or ethylene vinyl acetate copolymer (EVA).

One problem with making polymeric packaging involves costs associated with unused scrap material. Scrap material is generated from (a) unusable containers that are not within manufacturing specifications or (b) trim material produced during the formation of the container The scrap material may come from the substrate alone that forms the container or in combination with the film that forms the container. To reduce costs, it is desirable to use or recycle as much scrap material as possible in manufacturing the containers. The amount of recycled material used, however, should not compromise the quality of the container or raise other issues such as the processability of making the container.

For example, containers using scrap material having EVOH can have reprocessing problems such as degradation under high processing temperatures. The degradation can be exacerbated by the fact that EVOH has an affinity for attaching to metal, such as that used in extruders, that can extend the exposure of EVOH at these high temperatures. The degradation of EVOH can result in the appearance of undesirable black specks in the substrate.

Materials such as ethylene methyl acrylate copolymer (EMA) and ethylene vinyl acetate copolymer (EVA) have reprocessing problems such as cross-linking under high processing temperatures Cross-linking makes reprocessing more difficult because it leads to the formation of gels that increases the viscosity. EMA or EVA also has a tendency to adhere to the metallic surfaces, such as those used in extruders. The cross-linking and adherence lead to process instabilities such as surging or poor gauge control. If the amounts of EMA or EVA in the scrap material differ in the processing, this also leads to process instabilities in that the thickness of the substrate may become difficult to maintain because of a fluctuating pressure profile during extrusion.

EMA and EVA may also degrade rapidly which can affect the quality and impact toughness. Degradation of EMA and EVA may also result in the appearance of undesirable brown or black specks in the substrate.

Thus, it would be desirable to manufacture a container that reduces or eliminates the above-noted problems with existing containers.

SUMMARY OF THE INVENTION

According to one embodiment, a container comprises a substrate and a multi-layer film The substrate has a bottom wall and a continuous sidewall. The continuous sidewall encompasses the bottom wall and extends upwardly therefrom. The substrate comprises at least one particulate mineral filler and polypropylene. The multi-layer film is attached to the substrate and comprises at least a first layer and a second layer. The first layer comprises a metallocene-catalyzed polyolefin The second layer comprises polypropylene and is attached to the substrate. The substrate and the multi-layer film are made in the absence of ethylene vinyl alcohol copolymer (EVOH), ethylene vinyl acetate copolymer (EVA), and ethylene methyl acrylate copolymer (EMA).

According to one process of preparing meat in a modified atmosphere packaging, a container is provided that comprises a substrate and a multi-layer film The substrate has a bottom wall and a continuous sidewall. The continuous sidewall encompasses the bottom wall and extends upwardly therefrom. The substrate comprises at least one particulate mineral filler and polypropylene The multi-layer film is attached to the substrate and comprises at least a first layer and a second layer. The first layer comprises a metallocene-catalyzed polyolefin The second layer comprises polypropylene and is attached to the substrate. The substrate and the multi-layer film are made in the absence of ethylene vinyl alcohol copolymer (EVOH), ethylene vinyl acetate copolymer (EVA), and ethylene methyl acrylate copolymer (EMA). Meat is provided and placed in the container. A modified atmosphere is provided within the container and then the container is sealed.

According to one process of making a container, virgin material comprising at least one particulate mineral filler and polypropylene and recycled material comprising polypropylene are provided. A substrate comprising the virgin material and the recycled material is formed via extrusion. A multi-layer film is provided that comprises at least a first layer and a second layer The first layer comprises a metallocene-catalyzed polyolefin The second layer comprises polypropylene and is attached to the substrate The attached substrate and multi-layer film are thermoformed into a container. The container has a bottom wall and a continuous sidewall. The continuous sidewall encompasses the bottom wall and extends upwardly therefrom The substrate and the multi-layer film are made in the absence of ethylene vinyl alcohol copolymer (EVOH), ethylene vinyl acetate copolymer (EVA), and ethylene methyl acrylate copolymer (EMA).

According to another process of making a container, a substrate comprising at least one particulate mineral filler and a polypropylene is provided A multi-layer film is also provided that comprises at least a first layer and a second layer. The first layer comprises a metallocene-catalyzed polyolefin The second layer comprises polypropylene and is attached to the substrate The attached substrate and multi-layer film are formed into a container. The container has a bottom wall and a continuous sidewall. The continuous sidewall encompasses the bottom wall and extends upwardly therefrom. The substrate and the multi-layer film are made in the absence of ethylene vinyl alcohol copolymer (EVOH), ethylene vinyl acetate copolymer (EVA), and ethylene methyl acrylate copolymer (EMA).

Figure 1:
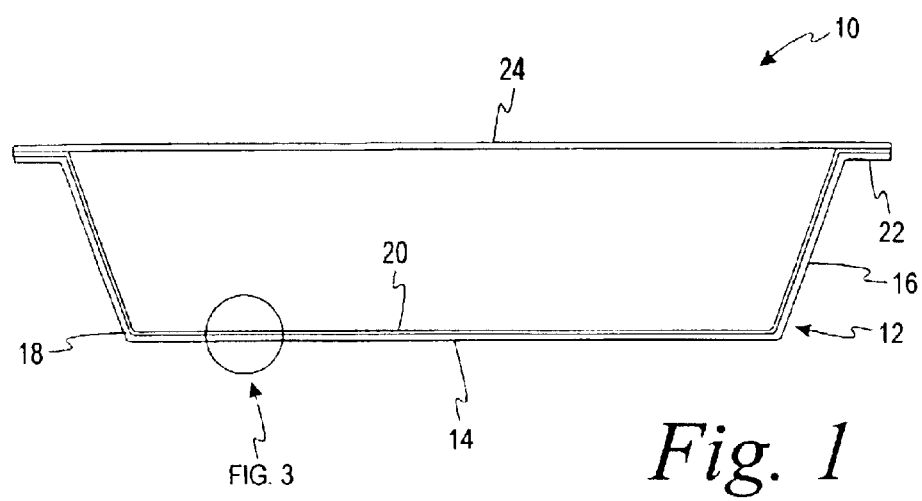
FIG. 1 is a side view of a container according to one embodiment of the present invention.

While the invention is susceptible to various modifications and alternative forms, specific embodiments thereof have been shown by way of example in the drawing and will herein be described in detail. It should be understood, however, that it is not intended to limit the invention to the particular forms disclosed but, on the contrary, the intention is to cover all modifications, equivalents, and alternatives falling within the spirit and scope of the invention as defined by the appended claims.

DESCRIPTION OF ILLUSTRATIVE EMBODIMENTS

Figure 2:
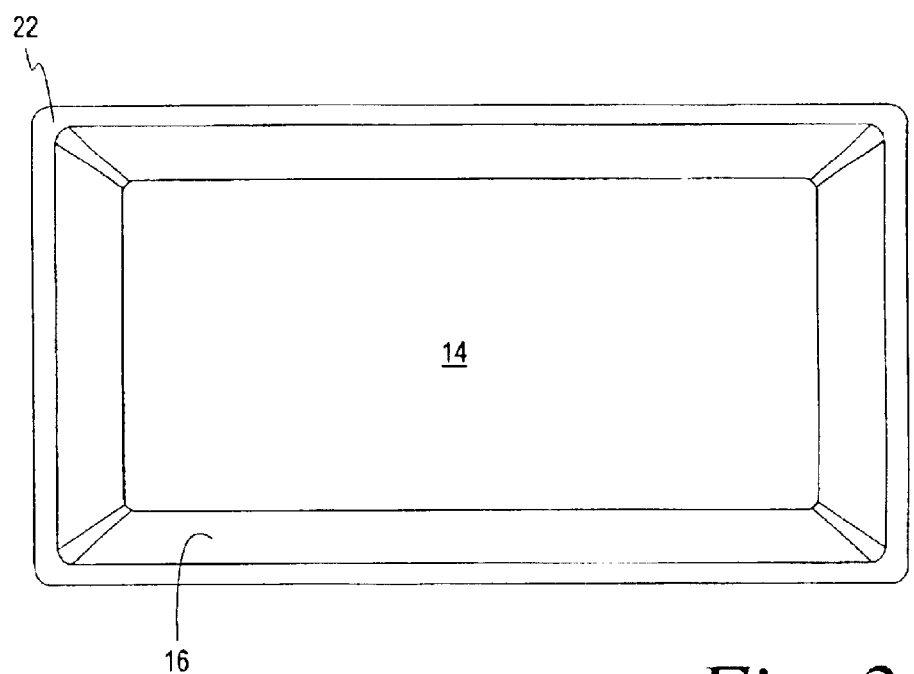
FIG. 2 is a top view of the container of FIG. 1 shown without the lidding.

Referring to FIGS. 1 and 2, a container 10 according to one embodiment of the present invention is shown. It is contemplated that the containers of the invention may be formed differently than depicted in FIGS. 1 and 2. For example, the height and shape of the container may vary from that shown without departing from the scope of the invention. It is contemplated that the containers of the present invention may have, for example, an oval, circular, rectangular, square, hexagonal, octagonal, or other polygonal shapes.

The containers of the present invention are typically used with food. The food may be packaged using a modified atmosphere. For example, the containers may contain meat or other products in modified atmosphere packaging. The modified atmosphere may be comprised of a variety of gases. For example, the modified atmosphere may include carbon monoxide, carbon dioxide, nitrogen, oxygen or combinations thereof. The containers, however, are not limited to use with only meat products, but may be used with other products such as produce, cereal, grains, and processed foods.

Food containers may be used for serving, storing, preparing and/or re-heating the food. Thus, it would be desirable for the containers to be microwavable, dishwasher-safe, and freezer-safe.

Referring back to FIGS. 1–2, the container 10 includes a continuous body portion 12. The body portion 12 includes a bottom wall 14 and a continuous sidewall 16 encompassing and projecting upwardly and outwardly from the bottom wall 14. It is contemplated that the sidewall may project only upwardly from the bottom wall 14 or even project upwardly and inwardly from the bottom wall 14. The body portion 12 of the container 10 includes a substrate 18 and a multi-layer film 20. For simplicity, FIG. 1 depicts the multi-layer film as being a single layer and the details of the multi-layer film will be discussed below in conjunction with FIG. 3.

The container 10 may have a continuous rim 22 encompassing and projecting laterally outwardly from the body portion 12. The continuous rim 22 may be formed of the same material as used in the substrate 18 and the multi-layer film 20. The container 10 may also contain lidding 24.

Figure 3:
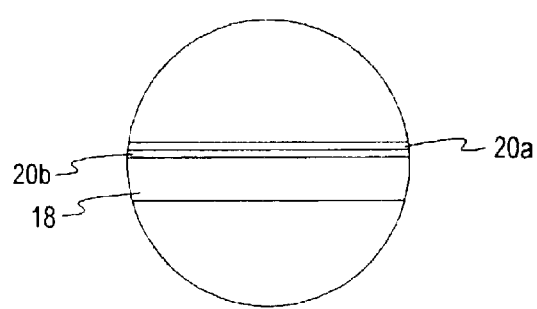
FIG. 3 is an enlarged view of generally circular area labeled FIG. 3 in FIG. 1.
Figure 4:
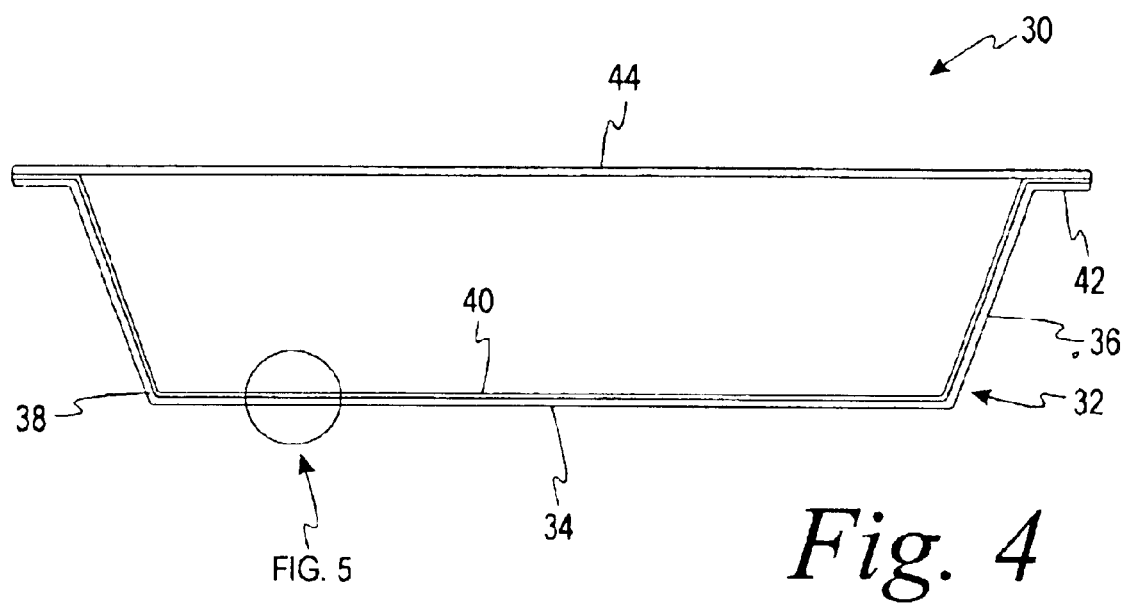
FIG. 4 is a side view of a container according to another embodiment of the present invention.
Figure 5:
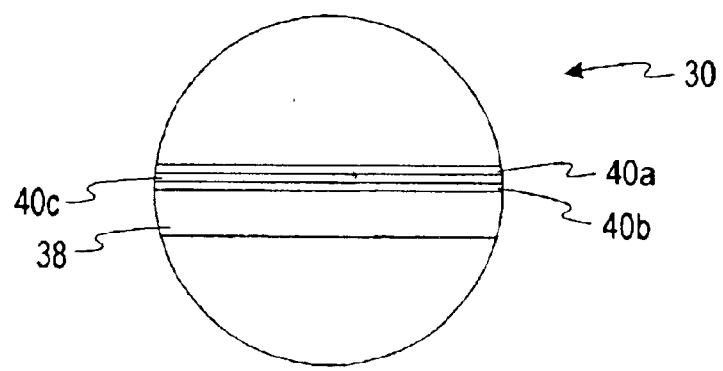
FIG. 5 is an enlarged view of generally circular area labeled FIG. 5 in FIG. 4.

Referring to FIGS. 4 and 5, a container 30 is shown according to another embodiment of the present invention The container 30 is the same as container 10 except that multi-layer film 40 has three layers, while the multi-layer film 20 of FIGS. 1–3 has two layers. The container 30 of FIGS. 4 and 5 includes a continuous body portion 32 which includes a bottom wall 34 and a continuous sidewall 36. The body portion 32 includes a substrate 38 and the multi-layer film 40. The container 30 may also include a continuous rim 42 and lidding 44.

Substrate

The substrates 18, 38 of the present invention comprise at least one particulate mineral filler and polypropylene One example of a polypropylene that may be used in forming the substrate is an impact copolymer polypropylene. An impact copolymer polypropylene is typically formed using polypropylene with ethylene-propylene rubber dispersed in a polypropylene matrix. Specifically, impact copolymer polypropylenes are physical mixtures of homopolymer polypropylene and random copolymer polypropylene The overall mixture of the impact copolymer polypropylene is typically from about 6 to about 15 wt. % ethylene. It is contemplated that other polypropylenes may be used such as random copolymer polypropylenes and polypropylene homopolymers. Random copolymers are ethylene/propylene copolymers that are is typically made in a single reactor by copolymerizing propylene and small amounts of ethylene (usually less than about 7 wt. %). It is contemplated that the substrate may be formed from a single layer or a plurality of layers.

The substrate may be a pre-compounded mineral-filled polypropylene. Alternatively, the substrate may be formed by direct compounding and extrusion of a polypropylene with at least one particulate mineral filler using a twin screw extruder Examples of particulate mineral fillers that may be used include, but are not limited to, talc, calcium carbonate, barium sulfate, wollastonite ($Ca_3(Si_3O_9)$), mica, clay, kaolin or combinations thereof. For example, the substrate may comprise talc, calcium carbonate and polypropylene. A substrate comprising at least one particulate mineral filler and polypropylene in combination with the multi-layer film generally provides much improved denesting as compared to a non-filled neat polypropylene substrate in combination with the multi-layer film. Additionally, a substrate comprising at least one particulate mineral filler and polypropylene is often more economical than the same non-filled neat polypropylene substrate.

The substrate comprising at least one particulate mineral filler and polypropylene also provides an unexpected reduced oxygen transmission rate as compared to the same non-filled neat polypropylene substrate For example, an impact copolymer polypropylene with 60 wt. % calcium carbonate can reduce the oxygen transmission rate by over 40% as compared to the same non-filled neat impact copolymer polypropylene. By reducing the oxygen transmission rate, the substrate becomes more effective in maintaining the modified atmosphere in the packaging.

A substrate comprising at least one particulate mineral filler and polypropylene may also enhance the printability thereon so as to eliminate the need for additional surface treatment A substrate comprising polypropylene and at least one particulate mineral filler is also heavier than the same non-filled neat polypropylene substrate which can result in a higher quality product.

Commercially available talc materials include MICROTUFF® 121, available from Specialty Minerals of New York, N.Y., and JETFILL® 675C, available from Luzenac America of Englewood, Colo. One example of a commercial calcium carbonate material is ground calcium carbonate under the tradename of Omyacarb FT, available from Omya, Inc, and Camel Fine ST, available from Imerys. It is contemplated that other types of calcium carbonate may be used including precipitated calcium carbonate. Commercially available barium sulfate includes Barite 1075, available from Polar Minerals, Atlanta, Ga. Commercially available wollastonite may be obtained from NYCO, Calgary, Alberta, Canada. Commercially available mica materials include ALBASHIELD® 15, available from Zemex Industrial Minerals, Inc.

The substrates generally comprise from about 20 to about 80 wt % and, more specifically, from about 30 to about 70 wt. % of the particulate mineral filler. For example, a calcium carbonate-filled polypropylene substrate may comprise from about 40 to about 70 wt. % and, more specifically, from about 50 to about 65 wt. % calcium carbonate with the remainder generally being polypropylene.

It is contemplated that other additives may be added to the substrate. For example, titanium dioxide ($TiO_2$) may be added to the substrate to provide a whitening effect. Other additives, such as other pigments, may be added to the substrate. The substrate, if made with recycled material, may include material that forms the multi-layer film. This, of course, depends on the type of recycled material used in forming the substrate.

The thickness of the substrates 18, 38 is generally from about 10 to about 80 mils, but is typically from about 15 to about 45 mils.

Multi-Layer Film

The multi-layer film 20 of FIG. 3 comprises a first layer 20a and a second layer 20b. It is contemplated that an additional optional third layer 40c may be included in forming the multi-layer film (see, e.g., multi-layer film 40 of FIGS. 4 and 5). The third layer 40c is located between the first layer 20a and the second layer 20b. It is contemplated that the multi-layer film 20 may include more than three layers.

The multi-layer films 20, 40, as well as the substrates 18, 38, are made in the absence of ethylene vinyl alcohol copolymer (EVOH), ethylene vinyl acetate copolymer (EVA), and ethylene methyl acrylate copolymer (EMA). In other words, the multi-layer films 20, 40, as well as the substrates 18, 38, do not include either EVOH, EVA, or EMA. As discussed above, the use of EVOH, EVA and EMA presents problems associated with the degradation and/or cross-linking thereof during reprocessing thereof. It is contemplated that other materials such as polyvinyl alcohol polymers (PVOH) or polyvinylidene chloride (PVDC) would also not be included in any significant amount in the multi-layer film or the substrate because of the same problems as EVOH.

First Layer

The first layers 20a, 40a of respective multi-layer films 20, 40 comprise a metallocene-based polyolefin The metallocene-based polyolefin may be a metallocene-catalyzed polyethylene (e.g., a linear low density polyethylene (mLLDPE)), a metallocene-catalyzed polyolefin plastomer or combinations thereof. The first layers 20a, 40a are adapted to attach to the lidding film, if used, so as to seal in the contents and any gases within the container.

The metallocene-based polyolefin resins used in forming the first layers 20a, 40a generally have a Vicat softening point as determined by ASTM D 1525 of less than about 110° C. and typically less than about 100 or 90° C. It is also desirable for the first layer to have low temperature sealability (i.e., seals at low temperatures) and good processibility.

An example of a metallocene-based polyolefin plastomer that may be used in the first layer is sold under the tradename AFFINITY™ PL 1881 by Dow Chemical Company. The metallocene-based polyolefin plastomers typically used in the first layer are ethylene-based polymers with a high copolymer content The polyolefin plastomers bridge the gap between polyethylenes and elastomers The density of the polyolefin plastomers is generally from about 0 915 to about 0.865 g/cm³.

The AFFINITY™ PL 1881 resin has a melt index of 1 0 g/10 min. as determined by ASTM D 1238, a density of 0 9035 g/cm³ as determined by ASTM D 792, and a Vicat softening point of 86° C. as determined by ASTM D 1525. The AFFINITY™ PL 1881 resin produces films having low temperature sealability, while having desirable hot tack seal strength. It is preferred to use the AFFINITY™ PL 1881 resin in a blend since this resin used alone has a lower extrusion output.

An example of a metallocene-based polyethylene that may be used in first layer is sold under the tradename ELITE™ 5401 by Dow Chemical Company The ELITE™ 5401 resin has a melt index of 10 g/10 min. as determined by ASTM D 1238, a density of 0.9175 g/cm³ as determined by ASTM D 792, and a Vicat softening point of 100° C. as determined by ASTM D 1525 The ELITE™ 5401 resin assists in the processability of the first layer.

According to one embodiment, the first layer comprises from about 50 to about 90 wt. % of the AFFINITY™ PL 1881 resin, and from about 10 to about 50 wt. % of the ELITE™ 5401 resin More specifically, the first layer may comprise about 70 wt. % of the AFFINITY™ PL 1881 resin and about 30 wt. % of the ELITE™ 5401 resin.

It is contemplated that the first layer may comprise a blend of metallocene-catalyzed linear low density polyethylene and linear low density polyethylene (LLDPE).

The thickness of the first layer is generally from about 10 to about 35 μm More specifically, the thickness of the first layer is from about 15 to about 30 μm.

Second Layer

The second layers 20b, 40b of respective multi-film layers 20, 40 comprise at least one polypropylene. For example, the second layer may comprise a random copolymer polypropylene, an impact copolymer polypropylene, or combinations thereof. It is contemplated that the second layer may comprise a blend of a random copolymer polypropylene or an impact copolymer polypropylene with a polypropylene homopolymer. The second layers 20b, 40b attach or adhere to respective substrates 18, 38. For example, the second layers 20b, 40b may be laminated to respective substrates 18, 38.

An example of a polypropylene that may be used in the second layer is a propylene-based resin sold under the tradename MOPLEN® EP 310D by Basell. It is believed that the MOPLEN® EP 310D resin is an impact copolymer polypropylene. The MOPLEN® EP 310D resin has a melt flow rate of 0.8 g110 min. as determined by ISO 1133, and a density of 0.900 g/cm³ as determined by ISO 1183.

Another example of a polypropylene that may be used in the second layer is a resin that is sold under the tradename ADFLEX™ Q 100F by Basell It is believed that the ADFLEX™ Q 100F resin is an impact copolymer polypropylene that contains a high ethylene content. The ADFLEX™ Q 100F resin has a melt flow rate of 0.6 g/10 min. as determined by ISO 1133, and a density of 0.890 g/cm$^3$ as determined by ISO 1183. The ADFLEX™ Q 100F resin has a very high softness, a very low modulus and acts as an adhesion promoter.

According to one embodiment, the second layer may comprise from about 50 to about 80 wt % of the MOPLEN® EP 310D resin, and from about 20 to about 50 wt. % of the ADFLEX™ Q 100F resin More specifically, the second layer may comprise about 60 wt. % of the MOPLEN® EP 310D resin and about 40 wt. % of the ADFLEX™ Q 100F resin.

The thickness of the second layer is generally from about 10 to about 35 μm. More specifically, the thickness of the second layer is from about 15 to about 30 μm.

Optional Third Layer

Referring to FIGS. 4 and 5, the optional third layer 40c of the multi-film layer 40 comprises at least one polypropylene For example, the optional third layer 40c may comprise an impact copolymer polypropylene, a random copolymer polypropylene or combinations thereof.

One of the functions of the optional third layer 40c is to provide better compatibility between the first and the second layers 40a, 40b of the multi-layer film 40. By providing better compatibility or adhesion promotion between the first and second layers, the third layer assists in preventing or inhibiting curling that tends to form when the layers have different shrinkage characteristics. The third layer is desired to provide the multi-layer film with additional rigidity It is also desirable for the third layer to assist in processing the multi-layer film.

An example of a polypropylene that may be used in the optional third layer 40c is a propylene-based resin sold under the tradename INSPIRE™ 112 by Dow Chemical Company It is believed that the INSPIRE™ 112 resin is an impact copolymer polypropylene. It is also believed that the INSPIRE™ 112 resin is metallocene-based impact copolymer polypropylene The INSPIRE™ 112 resin has a melt flow rate of 0.4 g/10 mm as determined by ASTM D 1238, and a density of 09 g/cm$^3$ as determined by ASTM D 792.

Another example of a polypropylene that may be used in the optional third layer 40c is a resin that is sold under the tradename ADFLEX™ Q 100F by Basell. It is believed that the ADFLEX™ Q 100F resin is an impact copolymer polypropylene that contains a high ethylene content The ADFLEX™ Q 100F resin has a melt flow rate of 0.6 g/10 min. as determined by ISO 1133, and a density of 0.890 g/cm$^3$ as determined by ISO 1183 The ADFLEX™ Q 100F resin has a very high softness, a very low modulus and acts as an adhesion promoter.

According to one embodiment, the optional third layer 40c comprises from about 50 to about 90 wt % of the INSPIRE™ 112 resin, and from about 10 to about 50 wt. % of the ADFLEX™ Q 100F resin. More specifically, the optional third layer 40c may comprise about 80 wt % of the INSPIRE™ 112 resin and about 20 wt. % of the ADFLEX™ Q 100F resin.

The thickness of the optional third layer 40c, if used, is generally from about 20 to about 50% of the total film thickness More typically, the thickness of the optional third layer 40c, if used, is from about 35 to about 45% of the total film thickness.

Under more typical conditions where the thickness of the multi-layer film is within about 15% of the thickness of the substrate, the multi-layer film of the present invention has little or no effect on the torque of the polypropylene substrate as measured by a torque rheometer The torque change (as measured by a torque rheometer) between a substrate with a multi-layer film and the substrate alone is generally less than about 25 or 20% More specifically, the torque change between a substrate with a multi-layer film and the substrate alone is typically less than about 15 or 10%. It is believed that the torque as measured by a torque rheometer is directly proportional to the melt viscosity.

The thickness of the multi-layer film is generally from about 30 to about 100 μm. More specifically, the thickness of the multi-layer film is from about 40 to about 60 μm. The multi-layer films are made in the absence of ethylene vinyl alcohol copolymer (EVOH), ethylene vinyl acetate copolymer (EVA) and ethylene methyl acrylate copolymer (EMA). In other words, the multi-layer films do not include either EVOH, EVA, or EMA.

If lidding (e.g., optional lidding 24 of FIG. 1) is used, the multi-layer film is also desired to have a good seal strength with the lidding material More specifically, the first layer of the multi-layer film is preferably compatible with the optional lidding.

The optional lidding film is typically made of a polymeric material, such as polyethylene or a polyethylene-based polymer The optional lidding film may be substantially impermeable to oxygen, nitrogen and/or carbon dioxide For example, the optional lidding may have at least one layer that comprises ethylene vinyl alcohol copolymers (EVOH), polyvinyl alcohols (PVOH), nylons, polyesters, ethylene vinyl dichloride copolymers (EVDC), liquid crystal polymers (LCPs), polyvinylidene chloride (PVDC), modified polyolefins with barrier properties, polyacrylonitriles, acrylonitrile copolymers, or combinations thereof. The containers of the present invention are typically disposable, but it is contemplated that they may be reused at a future time. The container of FIGS. 1 and 2 is shown as including one compartment, but it is contemplated that the containers may be formed of a plurality of compartments.

As discussed above, the containers are typically used with food items. A method of using such containers includes first placing the food therein The container with the food therein is then placed in a microwave and heated The containers may be used in the refrigerator and/or the freezer to store food The containers may be used to store food in a modified atmosphere packaging system, such as case-ready packaging.

The substrates of the present invention may be made using an extrusion process. According to one method of the present invention, pellets of a particulate mineral filler, a polypropylene resin and additives, if any, are added into an extruder. The pellets of the mineral filler, polypropylene resin and additives, if any, are melted to form a blend The pellets of the particulate mineral filler and polypropylene may be a pre-compounded or may be blended in the process with the other additives, if any. The blend is extruded through a die to form a substrate The extruder may be a single-screw extruder or a twin-screw extruder. The substrate may be opaque or a variety of colors or color combinations.

The multi-layer film may be formed by coextruding the layers together. For example, the multi-layer film may be formed by a blown film process or a cast film process The blown film process is typically biaxially orientated.

The multi-layer film is preferably attached to the substrate via a lamination process The laminating process may be thermal or adhesion laminating Alternatively, the multi-layer film may be co-extruded with the substrate. The attached substrate and multi-layer film may be formed by the use of conventional thermoforming (e.g., by pressure, vacuum or the combination thereof). The substrate and multi-layer film are formed (e.g., thermoformed) to a desired shape.

According to one process for making a container, a substrate comprises virgin material and recycled material. The virgin material comprises at least one particulate mineral filler and polypropylene. The virgin material is defined herein as non-reprocessed material The recycled material comprises polypropylene, which may further incorporate a particulate mineral filler. The recycled material may be comprised of a substrate portion and a multi-layer film portion. The virgin material and the recycled material are extruded to form a substrate.

A multi-layer film is provided and comprises at least a first layer and a second layer The first layer comprises a metallocene-catalyzed polyolefin such as, for example, a metallocene-catalyzed linear low density polyethylene (mLLDPE) or metallocene-catalyzed polyolefin plastomer The second layer comprises polypropylene. An optional third layer comprises polypropylene and is located between the first layer and the second layer. The substrate and the multi-layer film are made in the absence of ethylene vinyl alcohol copolymer (EVOH), ethylene vinyl acetate copolymer (EVA), and ethylene methyl acrylate copolymer (EMA) The second layer of the multi-layer film is attached to the substrate The second layer is typically attached to the substrate via a lamination process. The substrate and multi-layer film are formed into a container by, for example, thermoforming The container has a bottom wall and a continuous sidewall. The continuous sidewall encompasses the bottom wall and extends upwardly therefrom

EXAMPLES

To determine the effect of the multi-layer film on the melt viscosity of the particulate mineral-filled polypropylene substrate, experiments were conducted using various samples. The experiments measured torque in a torque rheometer. The torque from a torque rheometer has a direct correlation with melt viscosity. In other words, the higher the measured torque, the higher the melt viscosity of the materials. When comparing torques of a substrate without a multi-layer film and a substrate with a multi-layer film, a higher torque indicates a physical or chemical interaction of the substrate with the components of the multi-layer film.

The procedure for testing the torque began by placing cut-up samples of substrate and multi-film layer material (if used in the example) inside a Haake Rheomix 600. The Haake Rheomix 600 is a mixer for the Torque Rheometer Haake Rheocord 90, manufactured by Thermo Haake. The samples were melted and heated to about 482° F. The mixer was turned on for about 5 minutes and, during this time, the torque of the samples was measured.

The effect of the multi-layer film components on the torque was determined as a fractional change as shown below in Equation 1

$$\% \text{ torque change}=(t_{wf}-t_{wof})/t_{wof}$$

wherein
$t_{wf}$=the torque of the substrate with the multi-layer film
$t_{wof}$=the torque of the substrate without the multi-layer film The components of the tested multi-layer films are listed in Table 1. Comparative Film 2 was a seven-layer film that comprised an A/B/C/D/B/E configuration. Layer A of Comparative Film 2 was a low density polyethylene (LDPE) that included antiblock and slip. Layer B of Comparative Film 2 was a blend of linear low density polyethylene (LLDPE) and LDPE. Layer C of Comparative Film 2 was EVA, while layer D of Comparative Film 2 was EVOH. Layer E of Comparative Film 2 was a blend of a modified polyolefin, LDPE and antiblock. Comparative Film 2 is made by Ampac Specialty Films and is commercially available.

Comparative Film 3 was a six-layer film that comprised an A/B/C/D/E/E configuration. Layer A of Comparative Film 3 was a blend of 70 wt. % LLDPE (DOWLEX™ 5056E with a density of 0.920 g/cm³) and 30 wt. % LDPE (Basell's 2426F with a density of 0 924 g/cm³) Layer B of Comparative Film 3 was an LDPE-based tie layer (Tymor 1228B with a density of 0.920 g/cm³). Layer C of Comparative Film 3 was a blend of two EVOHs (Noltex's ET3803 with a density of 1.170 g/cm³ and Noltex's DC3203 with a density of 1 190 g/cm³). Layer D of Comparative Film 3 was a polypropylene-based tie layer (Rohm and Haas' Tymor 2206 with a density of 0.900 g/cm³). Layer E of Comparative Film 3 was a blend of 60 wt. % of the MOPLEN® EP 310D resin and 40 wt % of the ADFLEX™ Q 100F resin. The thickness of the layers in the configuration A/B/C/D/E/E of Comparative Film 3 was 14, 5, 8, 5, 10 and 8 μm, respectively.

Inventive Film 4 was a three-layer film that comprised an A/B/C configuration Layer A of Inventive Film 4 was 70 wt % of the AFFINITY™ PL 1881 resin and 30 wt. % of the ELITE™ 5401 resin. Layer B of Inventive Film 4 was 80 wt. % of the INSPIRE™ 112 resin and 20 wt. % of the ADFLEX™ Q 100F resin. Layer C of Inventive Film 4 was 60 wt. % of the MOPLEN® EP 310D resin and 40 wt % of the ADFLEX™ Q 100F resin The thickness of layers of the configuration A/B/C of Inventive Film 4 was 15, 20, and 15 μm, respectively.

The components of Comparative Films 2 and 3, and Inventive Film 4 are shown in Table 1 below.

TABLE 1

| Multi-layer Film # | EVOH (wt. %) | EVA-based tie resins (wt. %) | Ethylene-based polymers (wt %) | Propylene-based polymers (wt %) | Other additives (slip, antiblock) (wt. %) |
|---|---|---|---|---|---|
| Comparative Film 2 | 15.0% | 43.9% | 40.1% | 0% | 1.0% |
| Comparative Film 3 | 19.9% | 19.2% | 27.2% | 33.7% | 0% |
| Inventive Film 4 | 0% | 0% | 30.1% | 69.9% | 0% |

EVOH = ethylene vinyl alcohol copolymer
EVA = ethylene vinyl acetate copolymer

Referring to Table 2 below, Comparative Example 1 did not include a film, but only included the substrate. The substrate of Comparative Example 1 comprised 60 wt. % calcium carbonate, 2% titanium dioxide with the remainder being impact copolymer polypropylene. The impact copolymer polypropylene was made under the tradename 4280W by AtoFina. The 4280W resin has a melt flow rate of 1 2 g/10 min. The substrate used in Comparative Example 1 was identical to the substrate used in Examples 2–4. The impact copolymer polypropylene was fed into the throat of a twin-screw extruder and then was melted. The calcium carbonate and titanium dioxide were then added to the extruder and melted The calcium carbonate and titanium dioxide were mixed thoroughly with the melted impact copolymer polypropylene in the extruder. This mixture was extruded from the die to form the substrate.

Comparative Examples 2 and 3 included Comparative Films 2 and 3, respectively. As shown in Table 1 above, Comparative Films 2 and 3 each comprised EVOH and EVA. On the other hand, Inventive Example 4 with Inventive Film 4 did not include either EVOH or EVA. Thus, Examples 2–4 included a respective Film 2–4 and the above-described substrate that was identical to Comparative Example 1. Each of the Examples 2–4 comprised 7 wt. % of respective Film 2–4 with the remainder being substrate.

TABLE 2

| Example # | Multi-layer Film # | Multi-layer Film in Substrate (wt. %) | Torque at 2 minutes (m-g) | Fractional change in Torque at 2 min (%) |
|---|---|---|---|---|
| Comparative Example 1 | None | 0% | 496 | 0% |
| Comparative Example 2 | Comparative Film 2 | 7% | 726 | +46.4% |
| Comparative Example 3 | Comparative Film 3 | 7% | 678 | +36.7% |
| Inventive Example 4 | Inventive Film 4 | 7% | 555 | +11.9% |

As shown in Table 2, Comparative Examples 2 and 3 with a respective multi-layer film had an exceedingly high torque when compared to Comparative Example 1 (a substrate without the multi-layer film) Compare 726 and 678 vs. 496 m-g. Consequentially, Comparative Examples 2 and 3 had an undesirable fractional change in torque. It is believed that the EVOH and EVA of Comparative Examples 2 and 3 caused crosslinking and/or degradation, resulting in a significant increase in torque Such an increased torque is believed to lead to process instabilities such as surging and poor gauge control. The Inventive Example 4, on the other hand, had a desirable torque when compared to Comparative Example 1 (a substrate without the multi-layer film). Compare 555 vs. 496 m-g. The Inventive Example 4 also had a desirable fractional change in torque.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A container, comprising:
   a substrate having a bottom wall and a continuous sidewall, the continuous sidewall encompassing the bottom wall and extending upwardly therefrom, the substrate comprising at least one particulate mineral filler and polypropylene;
   a multi-layer film being attached to the substrate, the multi-layer film comprising at least a first layer and a second layer, the first layer comprising a metallocene-catalyzed polyolefin, the second layer comprising polypropylene and being attached to the substrate; and
   wherein the substrate and the multi-layer film are made in the absence of ethylene vinyl alcohol copolymer (EVOH), ethylene vinyl acetate copolymer (EVA), and ethylene methyl acrylate copolymer (EMA).

2. The container of claim 1, wherein the substrate comprises from about 20 to about 80 wt. % of the at least one particulate mineral filler.

3. The container of claim 2, wherein the substrate comprises from about 30 to about 70 wt. % of the at least one particulate mineral filler.

4. The container of claim 1, wherein the at least one particulate mineral filler is talc, calcium carbonate, barium sulfate, wollastonite, mica, clay, kaolin, or combinations thereof.

5. The container of claim 4, wherein the at least one particulate mineral filler is talc.

6. The container of claim 4, wherein the at least one particulate mineral filler is calcium carbonate.

7. The container of claim 4, wherein the at least one particulate mineral filler is talc and calcium carbonate.

8. The container of claim 1, wherein the torque of the substrate and the multi-layer film is within 25% of the torque of the substrate alone as measured by a torque rheometer.

9. The container of claim 8, wherein the torque of the substrate and the multi-layer film is within 15% of the torque of the substrate alone as measured by a torque rheometer.

10. The container of claim 1, wherein the substrate comprises a polypropylene homopolymer.

11. The container of claim 1, wherein the substrate comprises an impact copolymer polypropylene.

12. The container of claim 1, wherein the substrate comprises a random copolymer polypropylene.

13. The container of claim 1, wherein the thickness of the substrate is from about 10 to about 80 mils.

14. The container of claim 1, wherein the substrate is comprised of a plurality of layers.

15. The container of claim 1, wherein the first layer of the multi-layer film comprises at least one metallocene-catalyzed polyethylene, a metallocene-catalyzed polyolefin plastomer, or combinations thereof.

16. The container of claim 1, wherein the first layer of the multi-layer film comprises at least one metallocene-based linear low density polyethylene.

17. The container of claim 1, wherein the first layer of the multi-layer film has a Vicat softening point as determined by ASTM D 1525 of less than about 100° C.

18. The container of claim 1, wherein the second layer of the multi-layer film comprises impact copolymer polypropylene, random copolymer polypropylene, or combinations thereof.

19. The container of claim 1, wherein the second layer of the multi-layer film is laminated to the substrate.

20. The container of claim 1, wherein the multi-layer film further includes a third layer located between the first and second layers, the third layer of the multi-layer film comprises impact copolymer polypropylene, random copolymer polypropylene, or combinations thereof.

21. The container of claim 20, wherein the at least one particulate mineral filler and polypropylene are pre-compounded.

22. The container of claim 1, wherein the thickness of the multi-layer film is from about 30 to about 100 μm.

23. The process of preparing meat in a modified atmosphere packaging:
   providing a container comprising a substrate and a multi-layer film, the substrate having a bottom wall and a continuous sidewall, the continuous sidewall encompassing the bottom wall and extending upwardly therefrom, the substrate comprising at least one particulate mineral filler and polypropylene, the multi-layer film being attached to the substrate, the multi-layer film comprising at least a first layer and a second layer, the first layer comprising a metallocene-catalyzed polyolefin, the second layer comprising polypropylene and being attached to the substrate, and wherein the substrate and the multi-layer film are made in the absence of ethylene vinyl alcohol copolymer (EVOH), ethylene vinyl acetate copolymer (EVA), and ethylene methyl acrylate copolymer (EMA);

providing meat;

placing the meat in the container;

providing a modified atmosphere within the container; and sealing the container.

24. The process of claim 23, further including providing a lidding film and attaching the lidding film to a portion of the first layer so as to seal the container.

25. The process of claim 24, wherein the lidding film comprises at least one layer that includes ethylene vinyl alcohol copolymers (EVOH), polyvinyl alcohols (PVOH), nylons, polyesters, ethylene vinyl dichloride copolymers (EVDC), liquid crystal polymers (LCPs), polyvinylidene chloride (PVDC), modified polyolefins with barrier properties, polyacrylonitriles, acrylonitrile copolymers, or combinations thereof.

26. The process of claim 23, wherein the at least one particulate mineral filler is talc, calcium carbonate, barium sulfate, wollastonite, mica, clay, kaolin, or combinations thereof.

27. The process of claim 26, wherein the at least one particulate mineral filler is talc.

28. The process of claim 26, wherein the at least one particulate mineral filler is calcium carbonate.

29. The process of claim 26, wherein the at least one particulate mineral filler is talc and calcium carbonate.

30. A process for making a container, comprising:

providing virgin material comprising at least one particulate mineral filler and polypropylene;

providing recycled material comprising polypropylene;

extruding the virgin material and the recycled material to form a substrate;

providing a multi-layer film comprising at least a first layer and a second layer, the first layer comprising a metallocene-catalyzed polyolefin, the second layer comprising polypropylene;

attaching the second layer of the multi-layer film to the substrate;

thermoforming the attached substrate and multi-layer film into a container, the container having a bottom wall and a continuous sidewall, the continuous sidewall encompassing the bottom wall and extending upwardly therefrom; and wherein the substrate and the multi-layer film are made in the absence of ethylene vinyl alcohol copolymer (EVOH), ethylene vinyl acetate copolymer (EVA), and ethylene methyl acrylate copolymer (EMA).

31. The process of claim 30, wherein the attaching of the second layer of the multi-layer film to the substrate is done by a lamination process.

32. The process of claim 30, wherein the recycled material is comprised of a substrate portion and a multi-layer film portion.

33. The process of claim 30, wherein the substrate is extruded using a twin-screw extruder.

34. The process of claim 30, wherein the recycled material further comprises at least one particulate mineral filler.

35. The process of claim 30, wherein the at least one particulate mineral filler and polypropylene are pre-compounded to form the virgin material.

36. A process of making a container, comprising:

providing a substrate comprising at least one particulate mineral filler and polypropylene;

providing a multi-layer film comprising at least a first layer and a second layer, the first layer comprising a metallocene-catalyzed polyolefin, the second layer comprising polypropylene;

attaching the second layer of the multi-layer film to the substrate;

forming the attached substrate and multi-layer film into a container, the container having a bottom wall and a continuous sidewall, the continuous sidewall encompassing the bottom wall and extending upwardly therefrom; and wherein the substrate and the multi-layer film are made in the absence of ethylene vinyl alcohol copolymer (EVOH), ethylene vinyl acetate copolymer (EVA), and ethylene methyl acrylate copolymer (EMA).

37. The process of claim 36, wherein the forming of the attached substrate and multi-layer film into a container is done by thermoforming.

38. The process of claim 37, wherein the multi-layer film further includes a third layer located between the first and second layers, the third layer of the multi-layer film comprises impact copolymer polypropylene, random copolymer polypropylene, or combinations thereof.

* * * * *